Patented May 24, 1927.

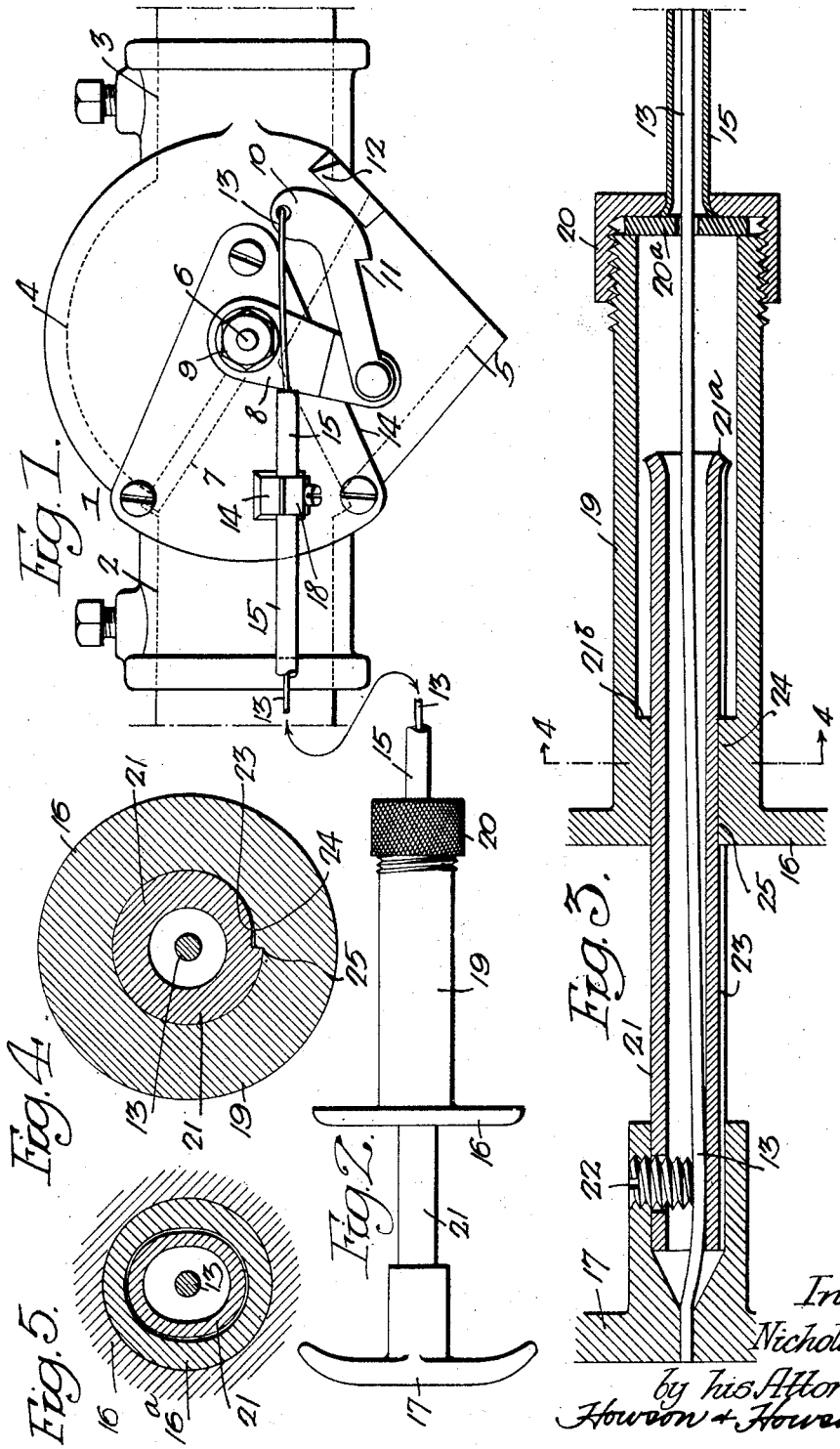

1,630,213

UNITED STATES PATENT OFFICE.

NICHOLAS A. PETRY, OF PHILADELPHIA, PENNSYLVANIA.

OPERATING DEVICE FOR VALVES AND THE LIKE.

Application filed February 24, 1925. Serial No. 11,210.

One object of this invention is to provide relatively simple, easily operated and durable means for actuating an element or member such as the movable element of a cutout valve, transom rod or the like, and the invention especially contemplates a device, whereby such a member, after being adjusted, may be positively locked in a given position so that in the case of a valve, it is effectually prevented from chattering.

Another object of my invention is to provide a relatively simple and inexpensive device for actuating an object or member at a distance and locking it in any of a number of adjusted positions;—the invention contemplating especially a novel form of longitudinally movable handle so constructed and mounted as to be conveniently and rigidly held in a given position.

A further object of the invention is to provide novel means for adjustably connecting a power-transmitting member, such as a flexible wire, to an operating handle or equivalent element, to permit of the ready assemblage and initial adjustment of the parts.

These objects and other advantageous ends, I attain as hereinafter set forth, reference being had to the accompanying drawings, in which, Figs. 1 and 2 are side elevations illustrating my invention as applied to a cut-out valve to hold the valve plate in the closed position;

Fig. 3 is an enlarged longitudinal sectional view of the adjusting and locking mechanism;

Fig. 4 is an enlarged transverse sectional view taken along the line 4—4 of Fig. 3;

Fig. 5 is a view similar to Fig. 4 but showing another form of the invention.

Referring to Fig. 1 of the drawing, 1 represents a well-known form of cut-out valve having an inlet 2 designed to be connected to the exhaust line of an internal combustion engine and also having, in line with said inlet, an outlet 3 for connection with a muffler. Between said inlet and outlet is a valve casing or body 4 made in the form of a cylindrically curved hollow structure having an atmospheric outlet or branch 5, projecting from its lower portion. Coaxially mounted within the body 4 is a spindle 6 carrying a substantially rectangular plate 7 which constitutes the movable element of the valve and by turning said spindle, this plate may be adjusted from the position in which it closes the branch 5 and permits the flow of gases from the inlet 2 to the muffler branch 3, to the position shown in Fig. 1 in which gases entering the inlet 2 are compelled to pass directly into the atmospheric outlet branch 5, to the exclusion of the muffler branch 3.

Obviously, the detail construction of the cut-out valve is immaterial but in order to actuate its movable element 7 and positively lock it in a position closing the atmospheric exhaust branch 5, I provide the parts hereinafter described. These comprise an arm 8 rigidly fastened to the spindle 6 in any suitable manner, as by means of a retaining nut 9, and extending at right angles to the spindle. On its outer or free end is pivotally mounted a latch hook 10, consisting of an arm having an angular notch 11 designed to engage an angular lug or abutment 12 projecting from the valve casing 4. When the movable element 7 is in the closed position, the hook latch 10 projects in a line substantially at right angles to the line of the arm 8 into engagement with the lug 12 and any force tending to rotate said latter arm in a clock-wise direction acts only to cause said latch to more closely and firmly engage said lug 12. For this purpose, the portion of said lug or abutment 12, fitting the notch 11, as well as the notch itself, has an angular form somewhat less than 90°, so that suction upon the valve element 7 cannot disengage the latch from its lug so as to permit opening of said element.

For actuating the hook latch 10, I provide a longitudinally adjustable wire 13 having one end attached to the free or outer end of the hook latch 10 and extending through a tube 15 and an escutcheon plate 16 to an operating handle 17. A support 14 is provided for the tube 15 and as shown this is made in the form of a post projecting from the valve casing 4 and having a groove in which one end of the tube is held by means of a clamp 18. The escutcheon plate 16 may be mounted at any suitable point distant from the cut-out valve, usually on the instrument board of the motor vehicle, and as shown in Fig. 2 it has fastened to it the second end of the guide tube 15. As illustrated, the plate 16 has formed with it a tubular projection 19 threaded at its end to engage a thimble 20. The end of the tube 15 extends through a hole in the thimble and is expanded to hold it in place. Preferably a washer 20ª is provided between the thimble 20 and the projection 19 to hold the tube 13 against endwise movement.

The operating handle 17 consists of a head having axially mounted in it a tube 21 longitudinally slidable within the tubular projection 19 of the escutcheon plate, and said head is preferably longitudinally perforated so that the wire 13 may be extended through it. A set screw 22 passes through the hub of the head 17 and also through the tube 21 into engagement with the wire 13. The set screw serves to hold all three parts together. Preferably the end of the tube 21 is enlarged or expanded as shown at 21ª. This enlargement is adapted to engage the shoulder 21ᵇ on the escutcheon plate to limit the motion of the handle and to prevent its complete withdrawal from the escutcheon plate.

By making the handle 17 with a through hole, as shown in Fig. 3, it is possible to run the wire 13 through it and properly adjust the length of said wire to obtain the best operative adjustment before tightening the set screw 22 and finally cutting off the surplus portion of the outer end of said wire.

In order to effectually lock the wire 13 with the parts attached thereto in any adjusted position, I preferably make the tube 21 of an external section other than circular, providing the escutcheon plate 10 with an opening of other than circular form for the reception of said tube. As shown in Fig. 4, these members are provided respectively with cam surfaces 23 and 24 which diverge from the corresponding true circular or cylindrical surface, preferably in the inward direction. As shown and as preferred, the outside of the tube and the inside of the hole in the escutcheon plate conform to true cylindrical surfaces throughout about three-quarters of their peripheries, but at the remaining quarter are formed with the said cam surfaces 23 and 24. These cam surfaces preferably conform to circular arcs of reduced radii struck from points eccentric of the normal center as indicated. The radii of these cam surfaces and the resulting angles are such that they will frictionally lock or jam when one of them is rotated with respect to the other. Other surfaces are provided at 25 which are approximately radial or at such an angle that they will limit rotative movement but will not jam.

As a consequence of the construction described, while the tube 21 may be freely moved longitudinally through the escutcheon 16 when the parts occupy certain relative positions, the tube by rotation may be caused to bind in the escutcheon 16, thus effectually preventing longitudinal movement of the tube 21 and wire 13. Reverse rotation of the head or handle 17 will free the tube 21 from the escutcheon and thereafter permit the easy longitudinal movement of said tube with its attached parts. The movement in the last said direction is definitely and positively limited by a stop. As shown, the stop comprises the aforesaid angular surfaces at 25 which come into engagement and limit the rotative movement.

It will be understood that since the aforesaid cam surface at 23 on the tube 21 extends the entire length of the tube, said tube may be caused to grip the escutcheon in any longitudinally adjusted position, and conveniently the wire 13, with its attached parts, may likewise be rigidly held not only in either of the extreme positions but may likewise be held or locked in any intermediate position.

When it is desired to open the cut-out valve, the handle 17 is drawn away from the escutcheon plate 16, so that the wire 13 is moved longitudinally, with the result that it swings the hook latch 10 away from the lug or abutment 12. Thereafter the continued longitudinal movement of the head 17 with the tube 21 and wire 13 will swing said arm 8, in the case illustrated, in a clockwise direction, into the position shown in Fig. 1, in which the muffler branch 3 is closed and direct communication is established between the inlet 2 and atmospheric exhaust branch 5. By giving the handle 17 and tube 21 a slight rotary movement, said tube may now be caused to jam in the escutcheon 16, whereupon the parts are firmly held in place. The parts are preferably so formed that this locking occurs after movement of the handle in the clockwise direction.

In order to close the cut-out valve, the handle 17 is first slightly turned in the reverse or counter-clockwise direction to release the tube 21 from the escutcheon plate 16. After the tube is thus released, a movement of the head toward the escutcheon plate 16 will move the wire 13 longitudinally. Through the latch arm 10 and arm 8, the valve element is closed and thereafter the notch 11 of said latch arm is caused to engage the angular edge of the lug 12. The resistance of the wire 13 to lateral bending will now tend to maintain said latch in engagement with the lug so that the valve element 7 cannot become unseated or chatter as might be the case if it was not positively held. Preferably the handle 17 is now again slightly rotated so as to lock the tube 21 to the escutcheon 16, although this is not absolutely necessary inasmuch as the latch engages the lug.

Instead of providing the parts 21 and 16 with the cam surfaces 23 and 24 respectively, as shown and as preferred, they may be made slightly elliptical in form as shown in Fig. 5. In this view I have shown a bushing 16ª in the escutcheon plate 16. With this construction the operation is substantially the same as that already described, except that no definite stop is provided to limit rotative movement in the unlocking direction.

This application constitutes a continuation in part of my copending application for valve latches, Serial No. 647,365 filed June 23, 1923.

What I claim is:

1. The combination of a device to be actuated; a longitudinally adjustable power transmitting element connected to said device; a fixed structure having an opening of other than circular outline; and a tubular member also of other than circular section connected to said element and freely movable through the opening of the fixed structure in one position but capable of frictionally gripping the same when rotated.

2. The combination of a device to be actuated; a longitudinally adjustable wire connected to said device; a handle connected to the wire; a member of other than circular section connected to the handle; and a relatively fixed structure having an opening for the reception of the member, formed to frictionally grip the same when said member is rotated.

3. The combination of a device to be actuated; a flexible longitudinally movable element for transmitting power to said device; a handle for said element including a head and a portion of other than circular section having an enlargement at the end opposite the head, with a fixed member having an opening of other than a circular outline through which said portion is longitudinally movable and in which the latter is rotatable so as to frictionally lock said element in any adjusted position, said fixed member having a shoulder positioned to cooperate with the enlargement of the handle portion to limit longitudinal movement thereof.

4. The combination of a device to be actuated; a longitudinally adjustable element connected to said device; an operating handle for the said element; means acting upon rotative movement of the handle in one direction to lock the handle and the said element against longitudinal movement; and a stop for positively and definitely limiting the rotative movement of the handle in the opposite direction.

5. The combination of a device to be actuated; a longitudinally adjustable element connected to said device; an operating handle for the said element; means acting upon rotative movement of the handle in one direction to frictionally lock the said handle and the said element in any position of longitudinal adjustment; and a stop for positively and definitely limiting the rotative movement of the handle in the opposite direction.

6. The combination of a device to be actuated; a longitudinally adjustable element connected to said device; a device for locking the said element against longitudinal movement comprising a relatively fixed structure having an opening therein; and a member fixed to said element and longitudinally movable through and approximately fitting the said opening in the said fixed structure; the said opening and the last said member being approximately circular in outline but having mating longitudinally extending cam surfaces diverging from the true circular outline, so that by turning the said member it may be frictionally locked to the said structure in any longitudinal position.

7. The combination of a device to be actuated; a longitudinally adjustable element connected to said device; a device for locking the said element against longitudinal movement comprising a relatively fixed structure having an opening therein; and a member fixed to said element and longitudinally movable through and approximately fitting the said opening in the said fixed structure; the said opening and the last said member being approximately circular in outline but having mating longitudinally extending cam surfaces conforming to eccentric circular arcs, so that by turning the said member it may be frictionally locked to the fixed structure in any longitudinal position.

8. The combination of a device to be actuated; a longitudinally adjustable element connected to said device; a device for locking the said element against longitudinal movement comprising a relatively fixed structure having an opening therein; and a member fixed to said element and longitudinally movable through and approximately fitting the said opening in the said fixed structure; the said opening and the last said member being approximately circular in outline but having mating longitudinally extending cam surfaces and also having approximately radial stop surfaces adjacent the cam surfaces, whereby they may be frictionally locked in any longitudinal position by turning the member in one direction and whereby turning in the other direction is definitely limited.

9. The combination of a device to be actuated; a longitudinally adjustable element connected to said device; a movable tube into which said element extends; a handle head having an opening for the reception of the tube; and means for rigidly connecting said element to the tube and to the head.

10. The combination of a device to be actuated; a longitudinally adjustable wire connected to said device; a movable tube into which said wire extends; a handle head having an opening for the reception of the tube; and a set screw for operatively connecting said wire to the tube and to the head.

11. The combination of a device to be actuated; a longitudinally adjustable wire connected to said device; a movable tube into which said wire extends; a handle head having an opening for the reception of the tube; and means for rigidly connecting the said wire to the tube and to the head, the said handle head having a hole for the end of the wire thus permitting the wire to be connected in any desired position and permitting the protruding end to be thereafter cut off.

12. In a control device, a member mounted for axial and for rotary movement, an engaging element adjacent thereto, an engaging part rigid on said member adapted when said member is rotated to wedge against said engaging element and thereby to lock the parts against motion.

13. In a control device, a member mounted for axial and for rotary movement, an engaging element adjacent and generally parallel thereto, an engaging part rigid on said member adapted when said member is rotated to wedge against said engaging element to lock the parts against motion.

14. In a control device, a member mounted for axial and for rotary movement, a housing therefor having an engaging face adjacent said control member, an engaging part rigid on said member adapted when said member is rotated to wedge against said engaging face to lock the parts against motion.

15. The combination of a device to be actuated; a longitudinally adjustable power transmitting element connected to said device; a device for locking said element against longitudinal movement comprising a relatively fixed structure having an opening of other than circular outline; a member connected to said element, also of other than circular outline, longitudinally movable through the opening of said fixed structure in one position and formed to frictionally grip the same when rotated into another position.

NICHOLAS A. PETRY.